June 21, 1966   P. F. DE VALLIERE   3,256,743
CONTROL DEVICE FOR COAXIAL MEMBERS
Filed June 16, 1961
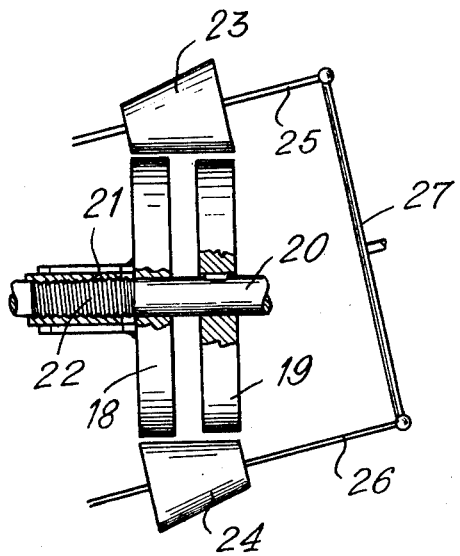
Fig. 2
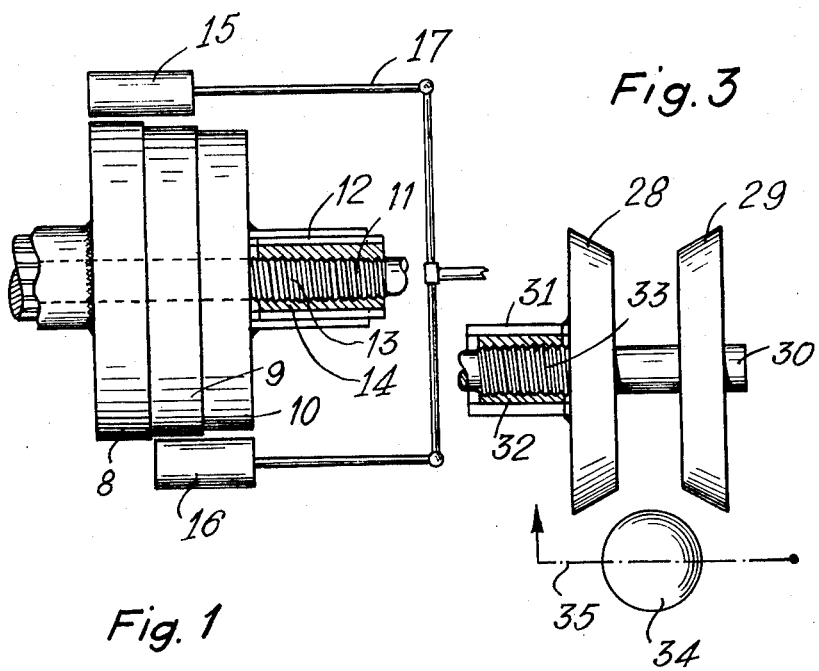
Fig. 3
Fig. 1

United States Patent Office 3,256,743
Patented June 21, 1966

3,256,743
CONTROL DEVICE FOR COAXIAL MEMBERS
Pierre Francois de Valliere, 14 Ave. de Bretteville,
Neuilly-sur-Seine, France
Filed June 16, 1961, Ser. No. 117,703
Claims priority, application France, June 21, 1960,
830,650, Patent 1,269,136
8 Claims. (Cl. 74—25)

In certain transmission systems it is often necessary to produce displacements or to control movement in rotating members.

The present invention has primarily for its object simple and reliable means for controlling such motion.

To this end, the invention comprises a control device comprising at least two coaxially rotating members capable of cooperating, over two slightly different radii, with a deformable friction type member.

In one embodiment, said transmission system comprises three pulleys in order to provide reversible relative motion between the pulleys.

In an alternative embodiment, a deformable friction member is formed, for example, by at least one loosely mounted roller, which can be placed into simultaneous contact with at least two pulleys of different diameters.

The roller may be mounted for cooperation with pulleys of identical diameter, in which case said roller will be tapered and carried on a shaft set obliquely in relation to the pulley shaft.

Reverse motion may be obtained by means of a pair of such rollers which are disposed symmetrically, at least insofar as their taper is concerned.

It is also possible to position, for cooperation, tapering pulleys opposite each other, in conjunction with a spherical roller the axis of which is movable and inclinable relative to that of the pulleys.

The description which follows with reference to the accompanying drawing, given by way of example and not of limitation will give a clear understanding of how the invention may be put into effect.

FIG. 1 is a schematic illustration of a control device employing cylindrical rollers and three pulleys.

FIG. 2 is a schematic illustration of an alternative variant with two tapered rollers.

FIG. 3 shows a third variant with a single spherical roller.

In the embodiments illustrated, the pulleys are mounted on coaxial shafts which cooperate via a screw-thread, so that their relative angular motion produces a relative axial displacement which can be used to actuate a given member (not shown). It is manifest also that this relative angular motion could be caused to operate on a crankshaft, a cam or any other convenient means, depending on the type of actuation it is desired to obtain.

In the embodiment shown in FIG. 1 there are provided three pulleys 8, 9 and 10 of decreasing diameter. The middle pulley 9 is carried by a shaft 11 and the end pulleys are rigidly connected to a tubular shaft 12 which cooperates with the shaft 11 through a screw-thread 13 and a nut 14. Obviously, the pulleys 8 and 10 could be interconnected through the medium of an external kinematic coupling (not shown).

Two rollers 15 and 16 made of adequately plastic and resilient material are able to cooperate, respectively, with two of the aforementioned pulleys. The roller 15 can be applied against the pulleys 8 and 9 and the roller 16 against the pulleys 9 and 10. This is achieved by means of a tilting type of coupling, illustrated schematically by the linkage 17. Pressure contact of the roller 15 provides a form of drive whereby travel of the thread 13 in the nut 14 takes place in one direction, while pressure contact of the roller 16 causes this travel to take place in the opposite direction, thereby making the drive reversible.

An identical result may be obtained with two pulleys 18 and 19 having substantially equal diameters. The pulley 19 is mounted on a shaft 20 while the pulley 18 is rigidly connected to a sleeve nut 21 cooperating with a threaded section 22 on the shaft 20. These two pulleys cooperate with two rollers 23 and 24 of reverse taper, mounted, as illustrated, in diametrically opposite positions, and the parallel axes 25 and 26 of these rollers are set obliquely relative to the shaft 20 and interconnected by a reversing linkage schematically represented by the reference numeral 27.

Application of one of these rollers against the two pulleys simultaneously will introduce a difference in the rate of rotation of the pulleys which will be a function of the difference between the mean radii of contact of the rollers 23 and 24.

As may be seen in FIG. 3, two pulleys 28 and 29, one of which is supported on a shaft 30 and the other on a hollow shaft 31 which is rigidly connected to a nut 32 cooperating with a threaded portion 33 on the shaft 30, have profiles with slight reverse taper. Between these two pulleys is a roller 34 of spherical shape. The roller 34 is supported on an axis 35 which may be moved towards or away from said pulleys and be inclined in relation to the shaft 30.

The radii of contact between said spherical roller and the pulleys may be equal, provided that the axis 35 is parallel to the shaft 30, in which case the two pulleys will rotate at the same speed. If, on the other hand, the axis 35 is inclined one way or the other, the contact radii will become unequal, as a result of which the pulleys will rotate at different speeds, thereby causing the nut 32 to travel along the threaded portion 33.

In all the embodiments illustrated, in order to prevent transverse displacement of the pulleys, the nuts are slidably keyed to their driving boss. The differences in diameter may be made very small in order to obtain slow rates of travel and to avoid excessive slip.

It is to be clearly understood that, without departing from the scope of the invention, many modifications may be made to the specific embodiments described by way of example only.

What I claim is:

1. A control device for producing controllable displacements, the control device comprising first and second pulley members, first and second shafts supporting said pulley members for rotation in coaxial relation, means operatively coupling said shafts together to enable relative axial displacement of said shafts with the pulley members rotating at different angular speeds, said pulley members including peripheral surfaces, and friction means temporarily engageable with the peripheral surfaces of the pulley members and operative therewith to cause said pulley members to rotate on said shafts at different angular speeds to obtain said relative axis displacement.

2. A device as claimed in claim 1, wherein said friction means is elastic.

3. A device as claimed in claim 1, wherein said means coupling said shafts together includes a threaded nut fixedly connected to one of said shafts, the other of said shafts including a threaded portion in threaded engagement in said nut.

4. A device as claimed in claim 1, wherein said pulley members have unequal diameters, and said friction means includes a cylindrical roller for engaging both said peripheral surfaces simultaneously.

5. A device as claimed in claim 4 comprising a third pulley member having a diameter unequal to those of the first said pulley members, one of the first said shafts supporting said third pulley member for rotation, all of said pulley members being coaxially supported in side by side relation, said cylindrical roller being of a width for only engaging two of said pulley members at a time.

6. A device as claimed in claim 1, wherein said pulley members are of equal diameter, said friction means including a roller of frusto conical shape, for engaging the peripheral surfaces of both said pulley members and means rotatably supporting said roller along an axis which is inclined with respect to the peripheral surfaces of said pulley members.

7. A device as claimed in claim 1, wherein said peripheral surfaces of the pulley members are inclined with respect to the axis of said pulley members, said friction means including a spehrical roller, and means supporting said roller for movement towards and away from the peripheral surfaces of the pulley members about an axis inclinable with the axis of said pulley members.

8. A device as claimed in claim 1, wherein said means coupling said shafts together permits displacement between said shafts in opposite directions, said pulley members moving in opposite direction relative to one another along the axis thereof with the pulley members having opposite directions of relative movement caused by said friction means.

References Cited by the Examiner
UNITED STATES PATENTS

| | | | |
|---|---|---|---|
| 215,778 | 5/1879 | Tyson | 74—22 |
| 276,264 | 4/1883 | Metcalf et al. | 74—22 |
| 657,842 | 9/1900 | Venn | 74—388 X |
| 1,162,458 | 11/1915 | Creveling | 74—25 X |
| 1,296,850 | 3/1919 | Rainey | 74—210 |
| 1,763,470 | 6/1930 | Lemon | 74—388 X |
| 2,181,234 | 11/1939 | Hawes | 74—22 |
| 2,817,242 | 12/1957 | Gray | 74—210 X |

FOREIGN PATENTS 592,640    9/1947    Great Britain.

MILTON KAUFMAN, *Primary Examiner.*

BROUGHTON G. DURHAM, DON A. WAITE,
*Examiners.*

T. W. SHEAR, *Assistant Examiner.*